US012607057B2

(12) United States Patent
Duer

(10) Patent No.: US 12,607,057 B2
(45) Date of Patent: Apr. 21, 2026

(54) ASSEMBLY FOR GUIDING A MOVABLE FURNITURE PART

(71) Applicant: Julius Blum GmbH, Hoechst (AT)

(72) Inventor: Stefan Duer, Schwarzach (AT)

(73) Assignee: JULIUS BLUM GMBH, Hoechst (AT)

( * ) Notice: Subject to any disclaimer, the term of this patent is extended or adjusted under 35 U.S.C. 154(b) by 97 days.

(21) Appl. No.: 18/210,900

(22) Filed: Jun. 16, 2023

(65) Prior Publication Data

US 2023/0332449 A1 Oct. 19, 2023

Related U.S. Application Data

(63) Continuation of application No. PCT/AT2021/060474, filed on Dec. 14, 2021.

(30) Foreign Application Priority Data

Dec. 17, 2020 (AT) .............................. A 51103/2020

(51) Int. Cl.
*E05F 1/16* (2006.01)
*E05D 15/58* (2006.01)

(52) U.S. Cl.
CPC .............. *E05F 1/16* (2013.01); *E05D 15/581* (2013.01); *E05Y 2201/47* (2013.01); *E05Y 2201/626* (2013.01); *E05Y 2201/654* (2013.01); *E05Y 2201/658* (2013.01); *E05Y 2400/818* (2013.01); *E05Y 2900/212* (2013.01)

(58) Field of Classification Search
CPC ...... E05F 1/16; E05D 15/581; E05Y 2201/47; E05Y 2201/626; E05Y 2201/654; E05Y 2201/658; E05Y 2900/212
See application file for complete search history.

(56) References Cited

U.S. PATENT DOCUMENTS 3,632,179 A * 1/1972 Vredevoogd ............ A47C 4/02 248/188.91
4,411,797 A 10/1983 Sander et al.
4,729,612 A 3/1988 Stone
(Continued)

FOREIGN PATENT DOCUMENTS

CN 101876228 11/2010
CN 107076276 8/2017
(Continued)

OTHER PUBLICATIONS

English translation of EP document. (Year: 2004).*
International Search Report issued Mar. 25, 2022 in International (PCT) Application No. PCT/AT2021/060474.

*Primary Examiner* — Brian E Glessner
(74) *Attorney, Agent, or Firm* — Wenderoth, Lind & Ponack, L.L.P.

(57) ABSTRACT

An assembly for guiding a movable furniture part includes a guide system to be fastened to a stationary furniture part, a support on which a movable furniture part can be pivotably mounted, and a compensation device for compensating for a tilting moment of the support, or of the movable furniture part positioned thereon, about a tilting axis by a restoring force, and the compensation device includes a cable pull device having a cable. A cable tensioning device is also provided for tensioning the cable, and the cable tensioning device includes a display device for displaying a cable tension.

26 Claims, 8 Drawing Sheets

(56) References Cited

U.S. PATENT DOCUMENTS

| | | | |
|---|---|---|---|
| 4,821,375 A | 4/1989 | Kozon | |
| 5,395,165 A | 3/1995 | Woerner | |
| 7,784,521 B2 * | 8/2010 | Mullet | E05D 13/10 160/315 |
| 10,470,571 B2 | 11/2019 | Ott | |
| 2010/0269291 A1 | 10/2010 | Haab et al. | |
| 2017/0002596 A1 * | 1/2017 | Laird | E05D 13/1261 |
| 2017/0219067 A1 | 8/2017 | Frappell | |
| 2018/0119468 A1 | 5/2018 | Abele | |
| 2018/0279780 A1 | 10/2018 | Ott | |
| 2019/0330898 A1 | 10/2019 | Rupp et al. | |
| 2022/0235597 A1 | 7/2022 | Hawkins et al. | |
| 2023/0003070 A1 | 1/2023 | Finke et al. | |
| 2023/0220718 A1 | 7/2023 | Dreyer et al. | |
| 2024/0392608 A1 * | 11/2024 | Millan | E05B 65/466 |

FOREIGN PATENT DOCUMENTS

| | | | |
|---|---|---|---|
| CN | 110199082 | 9/2019 | |
| CN | 111535706 | 8/2020 | |
| DE | 1 143 415 | 2/1963 | |
| DE | 28 47 578 | 5/1980 | |
| EP | 0 019 176 | 11/1980 | |
| EP | 1 394 349 | 3/2004 | |
| EP | 1394349 A1 * | 3/2004 | E05D 15/58 |
| EP | 3 832 062 | 6/2021 | |
| JP | 55-119873 | 9/1980 | |
| TW | 201838552 | 11/2018 | |
| WO | 2020/243786 | 12/2020 | |
| WO | 2021/245188 | 12/2021 | |

* cited by examiner

ASSEMBLY FOR GUIDING A MOVABLE FURNITURE PART

BACKGROUND OF THE INVENTION

The invention relates to an assembly for guiding a movable furniture part, preferably a sliding door or folding sliding door, on a stationary furniture part, preferably a furniture carcass. Furthermore, the invention relates to a piece of furniture with such an assembly, as well as a method for installing such an assembly.

Assemblies of the general type mentioned above are already known. A disadvantage with such solutions according to the state of the art is that the correct tension of the cable can be checked only with very great difficulty or not at all. If the cable is insufficiently or else too tightly tensioned, this has negative effects on the functioning of a cable pull device. In the worst case, the cable pull device does not function properly, which can lead to damage of a movable and/or stationary furniture part or a piece of furniture.

SUMMARY OF THE INVENTION

The object of the present invention is to avoid the described disadvantages according to the state of the art, and to specify an assembly which is improved compared with the state of the art for guiding a movable furniture part, preferably a sliding door or folding sliding door, on a stationary furniture part, preferably a furniture carcass, a piece of furniture with at least one such assembly and a method for installing such an assembly.

Therefore, according to the invention, the cable tensioning device comprises a display device for displaying (indicating) a cable tension. It can be read via the display device whether the cable tension of the cable is within a scope (acceptable predetermined range) suitable for the functioning of the cable pull device. If this is the case, then the cable can be fixed and thus be kept under tension. Thus, a monitoring of the cable tension is made possible via the display device, which makes the installation and also checking of an assembly according to the invention significantly easier.

Furthermore, a piece of furniture according to the invention includes at least one stationary furniture part, at least one movable furniture part, and at least one assembly according to one of the preceding claims. Preferably, the piece of furniture has at least one shaft-like cavity, in which the at least one movable furniture part can be arranged.

Moreover, a method according to the invention for installing an assembly according to one of the preceding claims is provided, wherein:

- in a first method step, the at least one guide system is fastened on the stationary furniture part,
- in a second method step, the support is connected to the at least one guide system in a movement-coupled manner, and
- in a third method step, the cable of the cable pull device is tensioned by the cable tensioning device.

Particularly preferably, the display device comprises a display element with an indicator. As a result, a display device can be easily realized.

The display device can comprise an energy storage mechanism, preferably a spring, particularly preferably a tension spring, and the energy storage mechanism applies a force to the display element.

Furthermore, the display element has a tensioning element, via which the display element is, preferably directly, operatively connected to the at least one cable.

A simple coupling of the display element with the cable can thereby be achieved.

In an embodiment of the invention, the display element is formed in one piece. This facilitates an uncomplicated structure and a cost-effective manufacturing of an assembly according to the invention.

According to a further embodiment of the invention, the cable tensioning device comprises at least two fixing elements for fixing (holding) the at least one cable.

Additionally, the cable tensioning device has at least one actuating element, preferably at least two actuating elements, for actuating the fixing elements.

An uncomplicated fixing of the cable is thereby made possible.

Preferably, the cable tensioning device has a housing, and it is particularly preferable that parts of the cable tensioning device and/or the display device are/is arranged at least partly inside the housing.

The housing thus protects parts of the cable tensioning device and/or the display device from outside influences, in particular from damage in transit or the like.

Furthermore, the housing has a cable guide for guiding the at least one cable. The cable can thereby be easily and cost-effectively guided in the area of the cable tensioning device.

Preferably, in addition to the at least one cable pull device, at least one pivot lever mechanism is provided. The at least one pivot lever mechanism comprises at least two pivot levers connected to each other in an articulated manner, the at least two pivot levers being pivotable relative to each other during a movement of the support on the stationary furniture part.

With respect to a method according to the invention, the third method step comprises the following steps:

- inserting the cable into the cable tensioning device,
- tensioning the cable until the display device verifies a sufficient cable tension,
- fixing the tensioned cable by means of the at least two fixing elements of the cable tensioning device, and
- stowing a cable end of the cable in or on the support.

BRIEF DESCRIPTION OF THE DRAWINGS

Further details and advantages of the invention are explained in more detail below by means of the description of the invention with reference to the drawings, in which.

DETAILED DESCRIPTION OF THE INVENTION

Figure 1:
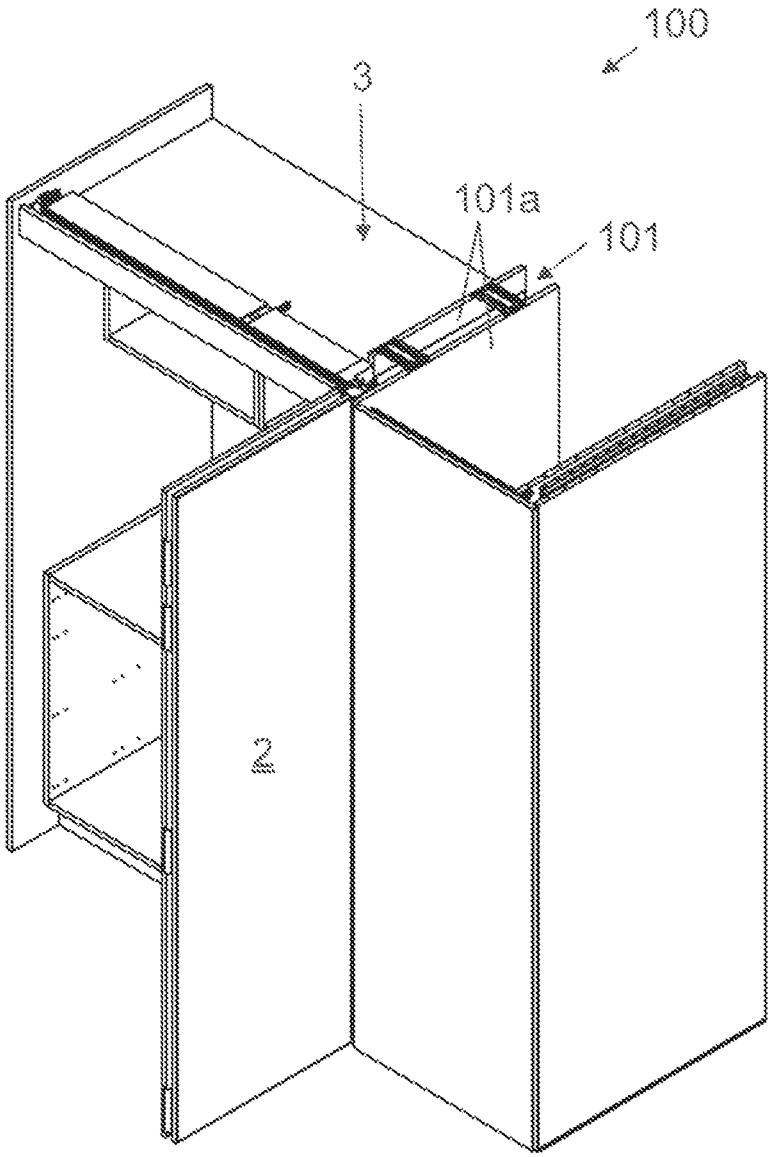
FIG. 1 shows a piece of furniture with an assembly according to the invention in a perspective view.

A piece of furniture 100, which can comprise different component parts, for example several compartments inside the piece of furniture 100, is represented schematically in a perspective view in FIG. 1. The stationary furniture part 3 is formed by a furniture carcass.

At the side of the piece of furniture 100, a cavity 101 is provided which is formed of two furniture walls 101*a* spaced apart from each other. A movable furniture part 2 in the form of a folding sliding door can be concealed in the cavity 101 in the folded-up state. If the folding sliding door is spread open, it conceals the interior of the piece of furniture 100.

The folding sliding door is composed of two partial flaps, which are folded up in the position according to FIG. 1. From this folded-up position, the folding sliding doors 2 can be transferred to a spread-open position, in which the partial flaps form an angle which is greater than 0°.

A further part of the piece of furniture 100 is arranged adjoining the cavity 101, for example a cupboard. If the folding sliding door is in a spread-open position and the further part of the piece of furniture 100 is closed, the folding sliding door and the further part of the piece of furniture 100 form a continuous furniture front.

Figure 2:
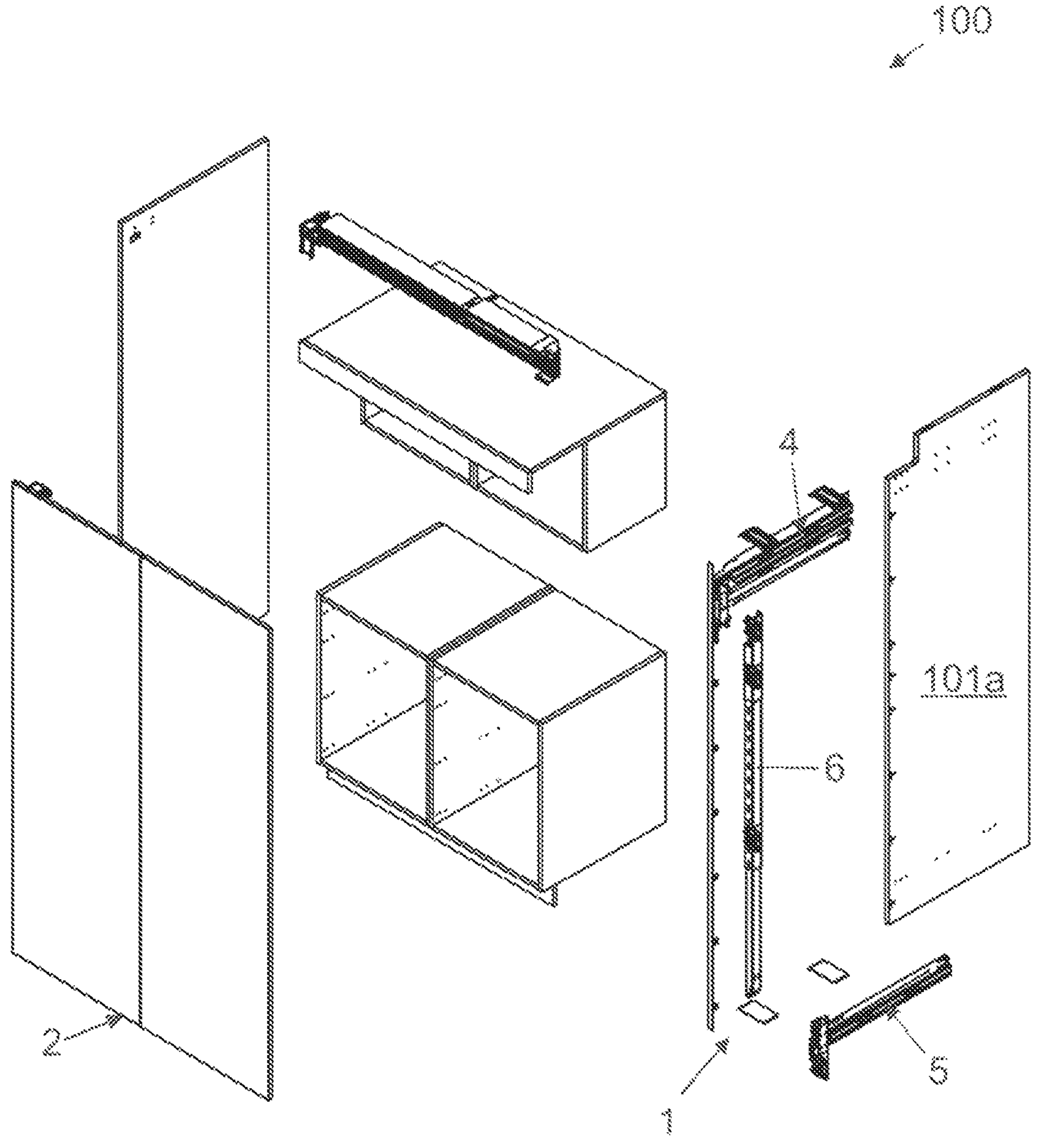
FIG. 2 is an exploded representation of a piece of furniture with an assembly according to the invention in a perspective view.

FIG. 2 shows an exploded representation of a piece of furniture 100 with an assembly 1 according to the invention in a perspective view. For better understanding the second furniture wall 101*a* of the cavity 101 is not represented. It is evident that the folding sliding door is in a fully spread-open position. Furthermore, two guide systems 4, 5 and a furniture wall 3 can be seen. A support 6 is also evident.

Figure 3:
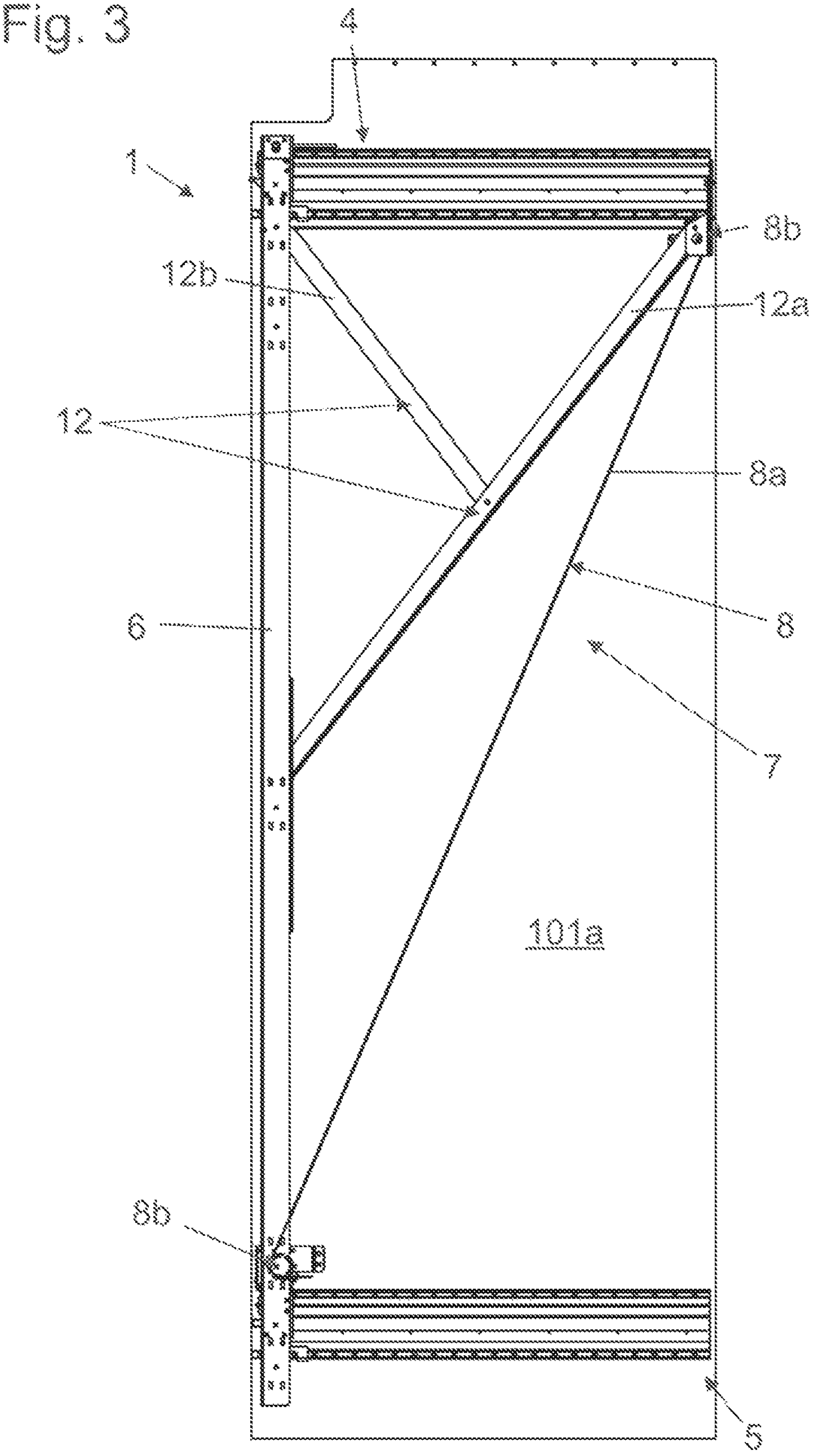
FIG. 3 shows a part of a piece of furniture with an assembly according to the invention.

FIG. 3 shows a part of a piece of furniture 100 with an assembly 1 according to the invention. A support 6 can again be seen, which is mounted displaceable on the two guide systems 4, 5.

A compensation device 7 consisting of a cable pull device 8 and a pivot lever mechanism 12 is also represented, and the compensation device 7 compensates for a tilting moment of the support 6 or of the movable furniture part 2 by applying a restoring moment. The pivot lever mechanism consists of a first 12*a* and a second pivot lever 12*b*. The first pivot lever 12*a* is arranged on the first guide system 4 and displaceable on the support 6. The second pivot lever 12*b* is arranged on the support 6 and centrally on the first pivot lever 12*a*. The cable pull device 8 comprises a cable 8*a* and guide pulleys 8*b*, which are arranged on the furniture wall 101*a* and/or on one of the two guide systems 4, 5.

The cable tensioning device 9 is arranged on the rear side of the support 6 and therefore does not appear in FIG. 3.

Figure 4:
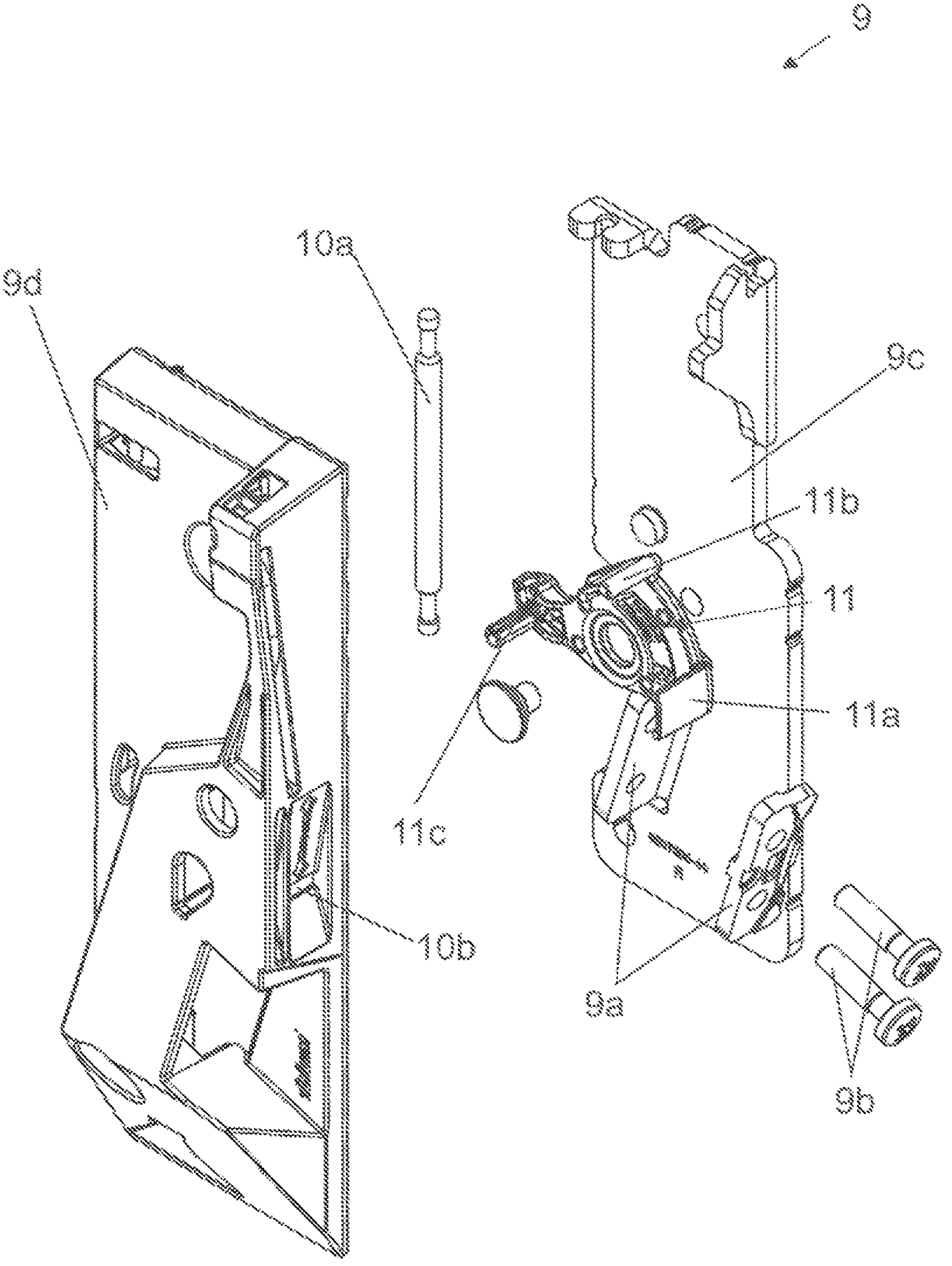
FIG. 4 is an exploded representation of a cable tensioning device according to the invention.
Figure 5A:
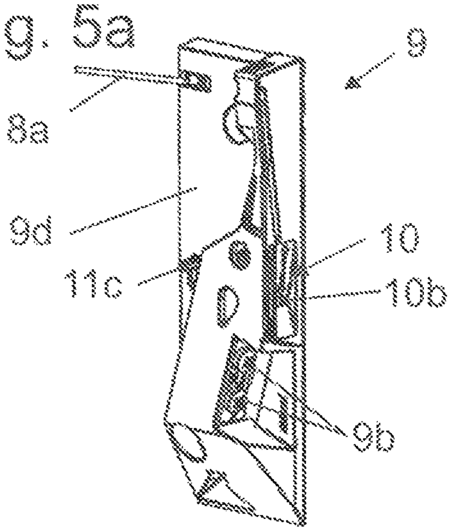
FIGS. 5*a-h* shows a cable tensioning device according to the invention in a perspective front view during a step of a method according to the invention.
Figure 5B:
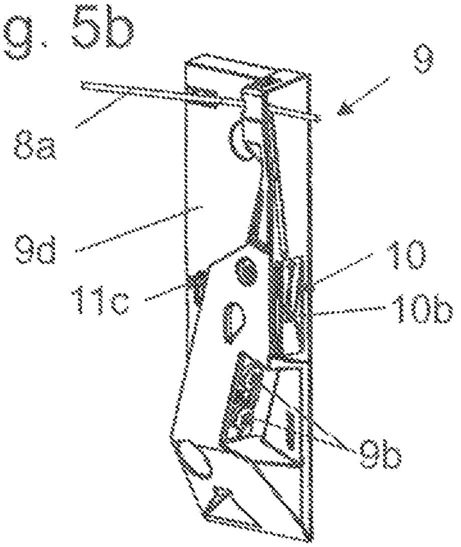
Figure 5C:
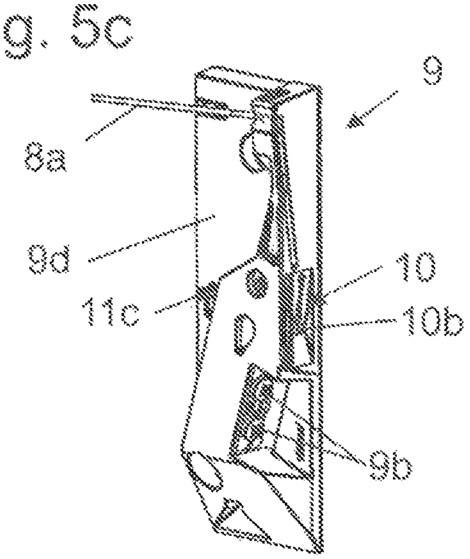

FIG. 4 shows an exploded representation of a cable tensioning device 9 according to the invention. A main body 9*c* can be seen, on which a display element 11 is rotatably mounted.

The display element 11 has an indicator 11*a*, a tensioning element 11*b* as well as an actuating lever 11*c*. In the present embodiment, the display element 11 is formed in one piece. However, a multi-part display element can also be provided.

In the present embodiment, the one-piece display element 11 is the same color as the indicator 11*a* (which is part of the one-piece display element 11). However, the indicator 11*a* can be specially-colored or have stickers or the like.

A force is applied to the display element 11 via an energy storage mechanism (tension spring) 10*a* of a display device 10. The display element 11 can also be twisted by hand via the actuating lever 11*c*.

Furthermore, a housing 9*d* can be seen, and the housing 9*d* has an indicator opening 10*b*. The indicator 11*a* of the display element 11 is visible in the indicator opening 10*b* during operation when there is sufficient cable tension.

Fixing elements 9*a* are furthermore formed on the main body 9*c*. A second fixing element 9*a* is arranged on a first fixing element 9*a* via actuating elements 9*b* in the form of screws. The cable 8*a* can be clamped and thus fixed (held) between the fixing elements 9*a*.

FIGS. 5*a* to 5*h* show a cable tensioning device 9 according to the invention in a perspective front view, and FIGS. 6*a* to 6*h* show the cable tensioning device 9 in a perspective rear view during steps of a method according to the invention.

FIGS. 5*a* to 5*f* and 6*a* to 6*f* show how a cable 8*a* is inserted into the cable tensioning device 9. The cable 8*a* is first guided through an inlet opening in the housing 9*d* and is then inserted into the housing 9*d* through the inlet opening (FIGS. 5*a* to 5*c* and 6*a* to 6*c* respectively). The housing 9*d* also serves as a cable guide for the cable 8*a*.

Figure 6A:
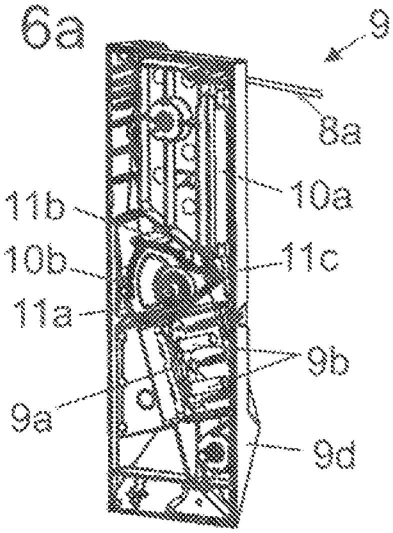
FIGS. 6*a-h* shows a cable tensioning device according to the invention in a perspective rear view during a step of a method according to the invention.
Figure 6B:
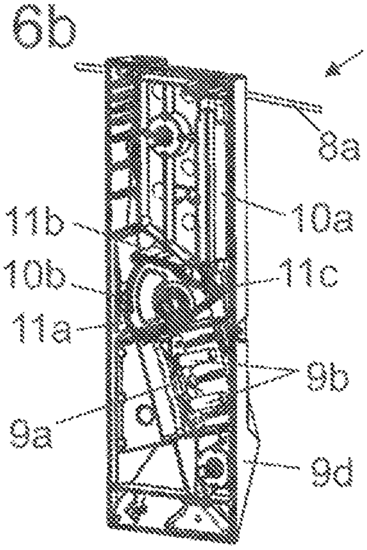
Figure 6C:
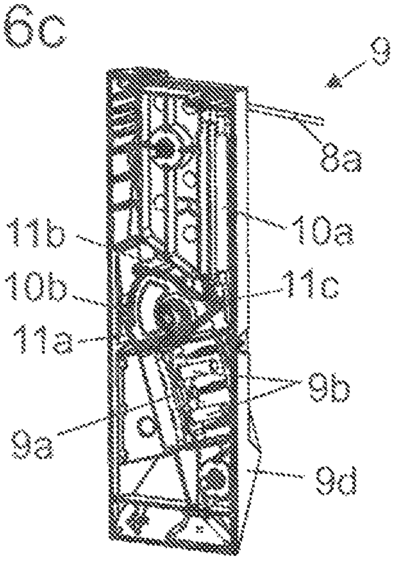

The main body 9*c* is in each case not represented in FIGS. 6*a* to 6*c*. It can be seen that the display element 11 is not moved.

Figure 5D:
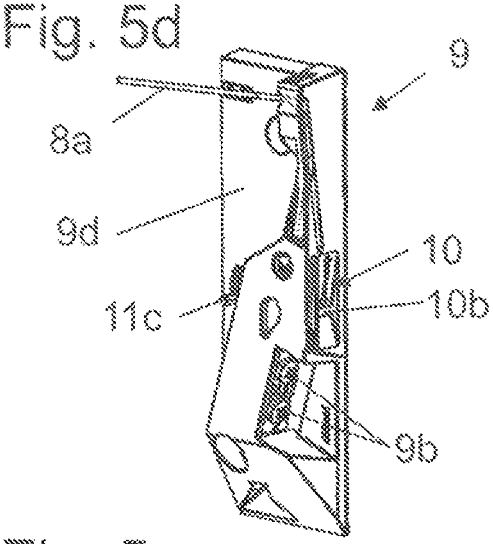
Figure 6D:
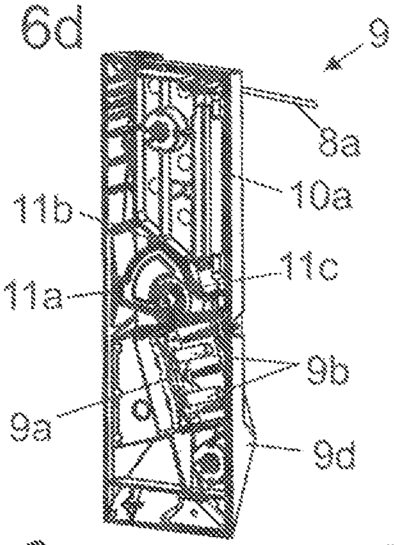

In a next step, the display element 11 is twisted against the force applied by the energy storage mechanism 10 via the actuating lever 11*c*. The cable 8*a* can then be guided between the indicator 11*a* and the tensioning element 11*b* (FIGS. 5*d* and 6*d*).

Figure 5E:
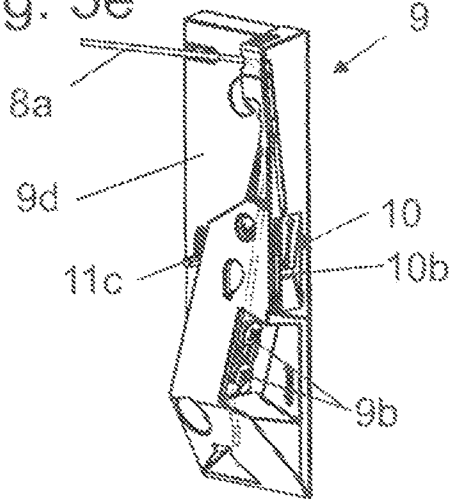
Figure 6E:
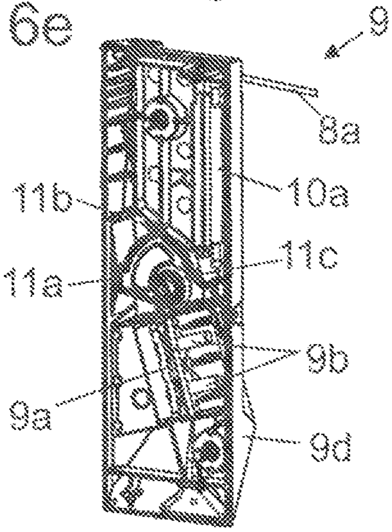
Figure 5F:
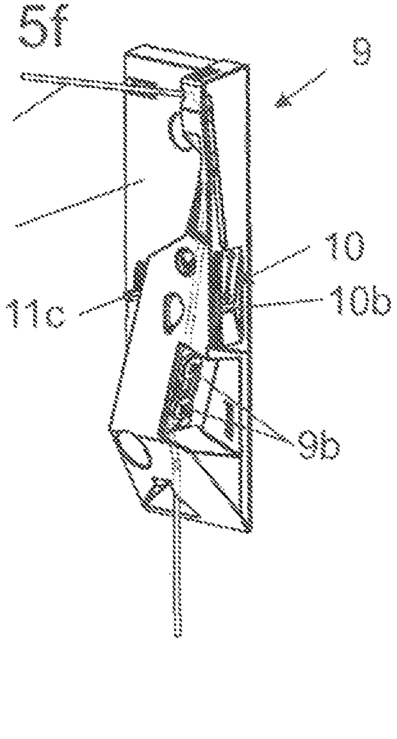
Figure 6F:
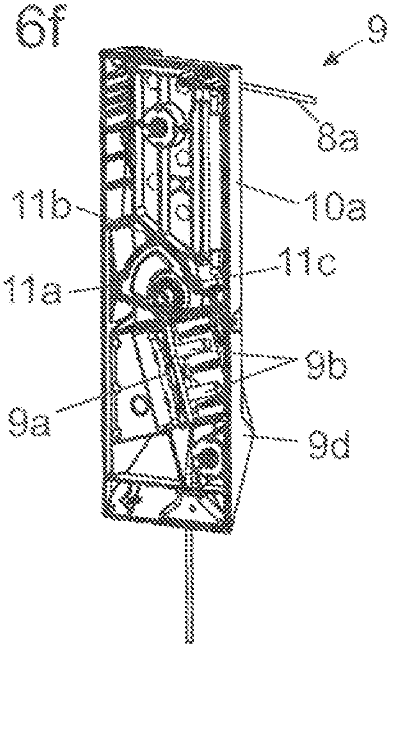

Then the cable 8*a* is guided between the fixing elements 9*a* and out of the housing 9*d* (FIGS. 5*e/f* and 6*e/f*). Meanwhile, the display element 11 is held in the twisted position via the actuating lever 11*c*.

If the cable 8*a* is arranged in the cable tensioning device 9 in this way, the actuating lever 11*c* can be released. The display element 11 is twisted in the direction of the original position because of the energy storage mechanism (tension spring) 10*a*. In the process, the tensioning element 11*b* presses against the cable 8*a* and thus represents an operative connection between the display element 11 and the cable 8*a*. The cable 8*a* is thereby lightly clamped at the same time, which prevents the cable 8*a* from slipping out of the cable tensioning device 9, for example during a transport process.

If the cable 8*a* is now tensioned, the cable presses against the tensioning element 11*b* because of the tension and in the process twists the display element 11 against the force applied by the energy storage mechanism (tension spring) 10*a* of the display device 10. If the cable tension is large enough, the display element 11 is twisted so that the indicator 11*a* can be seen through the indicator opening 10*b*. Thus, the display element 11 indicates a sufficient cable tension.

Figure 5G:
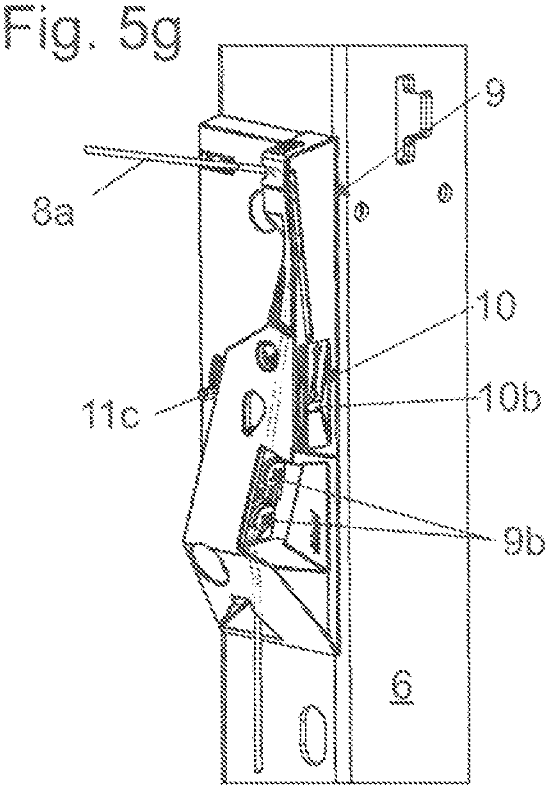
Figure 6G:
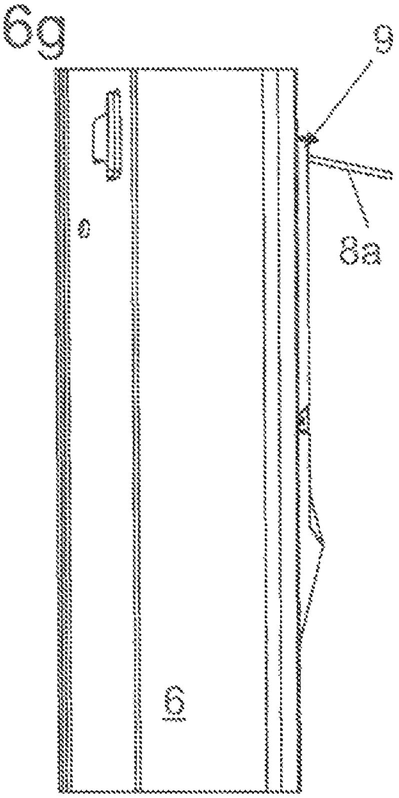
Figure 5H:
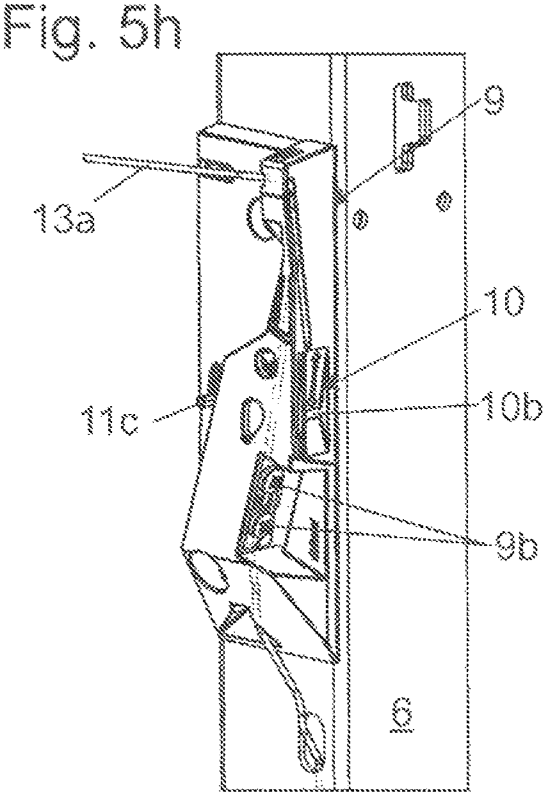
Figure 6H:
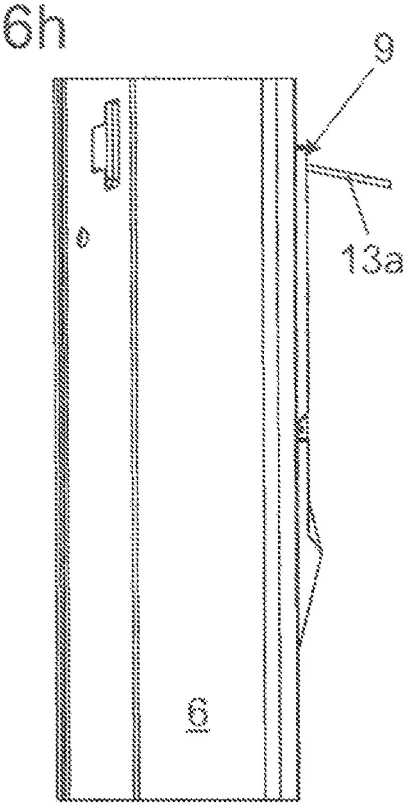

The cable can now be fixed via the fixing elements 9*a* while maintaining the cable tension, by actuating the actuating elements 9*b* (FIGS. 5*g*/6*g*). In the last step, a cable end of the cable 8*a* can be stowed in an opening of the support 6 (FIGS. 5*h*/6*h*).

Figure 7:
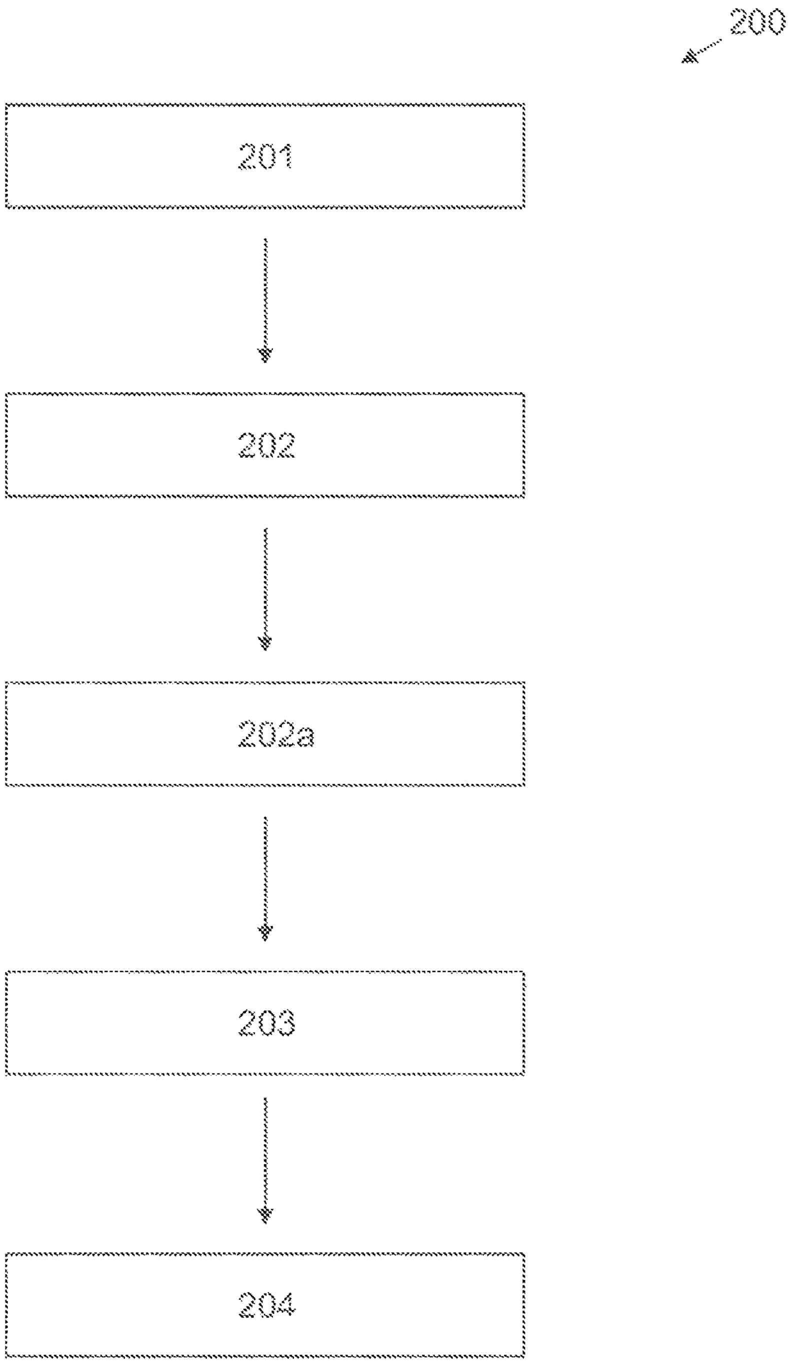
FIG. 7 is a flow diagram of a method according to the invention.

FIG. 7 shows a flow diagram of a preferred method 200 for installing an assembly 1 according to the invention on a furniture wall 3. The order of the method steps 201 to 204 of the method 200 can be seen.

LIST OF REFERENCE NUMBERS

1 assembly
2 movable furniture part

3 stationary furniture part
4 guide system
5 guide system
6 support
7 compensation device
8 cable pull device
8*a* cable
8*b* guide pulley
9 cable tensioning device
9*a* fixing elements
9*b* actuating elements
9*c* main body
9*d* housing
10 display device
10*a* energy storage mechanism (tension spring)
10*b* indicator opening
11 display element
11*a* indicator
11*b* tensioning element
11*c* actuating lever
12 pivot lever mechanism
12*a* first pivot lever
12*b* second pivot lever
100 piece of furniture
101 cavity
101*a* furniture wall

The invention claimed is:

1. An assembly for guiding a movable furniture part on a stationary furniture part, comprising:

a guide system to be fastened on the stationary furniture part, a support on which the movable furniture part is to be pivotably mounted, a compensation device configured to compensate for a tilting moment of the support or of the movable furniture part arranged thereon about a tilting axis, and the compensation device includes a cable pull device including a cable, and a cable tensioning device configured to tension the cable of the compensation device, the cable tensioning device comprising a housing and a display device including an indicator arranged to be visible in the housing when a cable tension of the cable is within an acceptable predetermined range.

2. The assembly according to claim 1, wherein the display device comprises a display element, the indicator being part of the display element.

3. The assembly according to claim 2, wherein the display device further comprises an energy storage mechanism configured to apply a force to the display element.

4. The assembly according to claim 2, wherein the display element includes a tensioning element configured to operatively connect the display element to the cable.

5. The assembly according to claim 2, wherein the display element includes an actuating lever configured to allow manual actuation of the display element.

6. The assembly according to claim 2, wherein the display element has a one-piece construction.

7. The assembly according to claim 1, wherein the cable tensioning device further includes at least two fixing elements configured to hold the cable.

8. The assembly according to claim 7, wherein the cable tensioning device further includes an actuating element configured to actuate the fixing elements.

9. The assembly according to claim 1, wherein the cable tensioning device comprises a main body.

10. The assembly according to claim 2, wherein the display element is movably mounted on the main body.

11. The assembly according to claim 1, wherein the housing comprises an indicator opening, the indicator being visible through the indicator opening when the cable tension of the cable is within the acceptable range.

12. The assembly according to claim 1, wherein the housing has a cable guide for guiding the cable.

13. The assembly according to claim 1, wherein parts of the cable tensioning device are arranged at least partially inside the housing.

14. The assembly according to claim 1, wherein the compensation device further includes a pivot lever mechanism including at least two pivot levers connected to each other in an articulated manner, the at least two pivot levers being pivotable relative to each other during a movement of the support on the stationary furniture part.

15. The assembly according to claim 3, wherein the energy storage mechanism is a tension spring.

16. The assembly according to claim 4, wherein the display element is directly operatively connected to the cable via the tensioning element.

17. The assembly according to claim 8, wherein the actuating element is a first actuating element, the cable tensioning device further including a second actuating element configured to actuate the fixing elements.

18. The assembly according to claim 17, wherein at least one of the first actuating element and the second actuating element is formed on the main body.

19. The assembly according to claim 10, wherein the display element is rotatably mounted on the main body.

20. A piece of furniture comprising:

a stationary furniture part, a movable furniture part, and the assembly according to claim 1.

21. The piece of furniture according to claim 20, wherein the stationary furniture part has a cavity to allow the movable furniture part to be arranged therein.

22. A method for installing the assembly according to claim 1, the method comprising:

fastening the guide system on the stationary furniture part, connecting the support to the guide system in a movement-coupled manner, and tensioning the cable of the cable pull device via the cable tensioning device.

23. The method according to claim 22, wherein the tensioning comprises:

inserting the cable into the cable tensioning device, tensioning the cable until the display device indicates a sufficient cable tension, fixing the tensioned cable via at least two fixing elements of the cable tensioning device, and stowing a cable end of the cable in or on the support.

24. The method according to claim 22, further comprising connecting at least one of at least two pivot levers of the compensation device to the guide system and/or to the stationary furniture part.

25. The method according to claim 22, further comprising installing a movable furniture part on the support.

26. An assembly for guiding a movable furniture part on a stationary furniture part, comprising:

a guide system to be fastened on the stationary furniture part, a support on which the movable furniture part is to be pivotably mounted, a compensation device configured to compensate for a tilting moment of the support or of the movable furniture part arranged thereon about a tilting axis, and the compensation device includes a cable pull device including a cable, and a cable tensioning device configured to tension the cable of the compensation device, the cable tensioning device comprising a housing having an indicator opening and a display device configured to indicate a cable tension of the cable.

* * * * *